US008892997B2

(12) United States Patent
Louch et al.

(10) Patent No.: US 8,892,997 B2
(45) Date of Patent: Nov. 18, 2014

(54) OVERFLOW STACK USER INTERFACE

(75) Inventors: John O. Louch, San Luis Obispo, CA (US); Christopher Hynes, Santa Cruz, CA (US); Timothy Wayne Bumgarner, Sharpsburg, MD (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 675 days.

(21) Appl. No.: 11/760,610

(22) Filed: Jun. 8, 2007

(65) Prior Publication Data

US 2008/0307303 A1    Dec. 11, 2008

(51) Int. Cl.
*G06F 3/14* (2006.01)
*G06F 3/048* (2013.01)
*G06F 3/0481* (2013.01)

(52) U.S. Cl.
CPC .................... *G06F 3/0481* (2013.01)
USPC .......................... 715/273; 715/782

(58) Field of Classification Search
USPC .......................... 715/826, 811, 815, 273, 782
See application file for complete search history.

(56) References Cited

U.S. PATENT DOCUMENTS

| | | |
|---|---|---|
| 5,317,687 A | 5/1994 | Torres |
| 5,339,390 A | 8/1994 | Robertson et al. |
| 5,452,414 A | 9/1995 | Rosendahl et al. |
| 5,461,710 A | 10/1995 | Bloomfield et al. |
| 5,515,486 A | 5/1996 | Amro et al. |
| 5,555,354 A | 9/1996 | Strasnick et al. |
| 5,565,657 A | 10/1996 | Merz |
| 5,657,049 A | 8/1997 | Ludolph et al. |
| 5,673,377 A | 9/1997 | Berkaloff |
| 5,678,015 A | 10/1997 | Goh |
| 5,736,985 A | 4/1998 | Lection et al. |
| 5,745,109 A | 4/1998 | Nakano et al. |
| 5,745,715 A | 4/1998 | Pickover et al. |
| 5,754,809 A | 5/1998 | Gandre |
| 5,767,854 A | 6/1998 | Anwar |
| 5,767,855 A | 6/1998 | Bardon et al. |
| 5,801,699 A | 9/1998 | Hocker et al. |
| 5,802,466 A | 9/1998 | Gallant et al. |
| 5,825,361 A | 10/1998 | Rubin et al. |
| 5,835,094 A | 11/1998 | Ermel et al. |
| 5,847,707 A | 12/1998 | Hayashida |
| 5,880,733 A | 3/1999 | Horvitz et al. |
| 6,002,403 A | 12/1999 | Sugiyama et al. |
| 6,005,579 A | 12/1999 | Sugiyama et al. |
| 6,016,145 A | 1/2000 | Horvitz et al. |
| 6,025,827 A | 2/2000 | Bullock et al. |
| 6,025,839 A | 2/2000 | Schell et al. |

(Continued)

OTHER PUBLICATIONS

Three-Dimensional Desktop—Google Search [on-line], [retrieved Nov. 9, 2006]. Retrieved from the Internet URL: http://www.google.com/search?sourceid=navclient&ie=U...LJ:2006-42,GGLJ:en&q=%22three+dimensional+desktop%22.

(Continued)

*Primary Examiner* — Tadeese Hailu
*Assistant Examiner* — Darrin Hope
(74) *Attorney, Agent, or Firm* — Fish & Richardson P.C.

(57) ABSTRACT

Systems and methods for providing an overflow stack. An overflow stack can be generated based upon adjustments to a group display area and based upon application of one or more display criterion. An overflow stack can include representation of any system objects that can not be displayed in an adjusted group display area based upon the one or more display criterion.

25 Claims, 6 Drawing Sheets

(56) References Cited

U.S. PATENT DOCUMENTS

| | | |
|---|---|---|
| 6,043,817 A | 3/2000 | Bolnick et al. |
| 6,043,818 A | 3/2000 | Nakano et al. |
| 6,054,989 A | 4/2000 | Robertson et al. |
| 6,088,032 A | 7/2000 | Mackinlay |
| 6,122,647 A | 9/2000 | Horowitz et al. |
| 6,160,553 A | 12/2000 | Robertson et al. |
| 6,166,738 A | 12/2000 | Robertson et al. |
| 6,188,405 B1 | 2/2001 | Czerwinski et al. |
| 6,229,542 B1 | 5/2001 | Miller |
| 6,243,093 B1 | 6/2001 | Czerwinski et al. |
| 6,243,724 B1 | 6/2001 | Mander et al. |
| 6,262,732 B1 | 7/2001 | Coleman et al. |
| 6,271,842 B1 | 8/2001 | Bardon et al. |
| 6,275,829 B1 | 8/2001 | Angiulo et al. |
| 6,281,898 B1 | 8/2001 | Nikolovska et al. |
| 6,313,855 B1 | 11/2001 | Shuping et al. |
| 6,363,404 B1 | 3/2002 | Dalal et al. |
| 6,388,181 B2 | 5/2002 | Moe |
| 6,414,677 B1 | 7/2002 | Robertson et al. |
| 6,426,761 B1 | 7/2002 | Kanevsky et al. |
| 6,469,722 B1 | 10/2002 | Kinoe et al. |
| 6,480,210 B1 | 11/2002 | Martino et al. |
| 6,542,168 B2 | 4/2003 | Negishi et al. |
| 6,570,597 B1 | 5/2003 | Seki et al. |
| 6,577,304 B1 | 6/2003 | Yablonski et al. |
| 6,577,330 B1 | 6/2003 | Tsuda et al. |
| 6,583,798 B1 | 6/2003 | Hoek et al. |
| 6,590,593 B1 | 7/2003 | Robertson et al. |
| 6,597,358 B2 | 7/2003 | Miller |
| 6,727,924 B1 | 4/2004 | Anderson |
| 6,734,884 B1 | 5/2004 | Berry et al. |
| 6,765,567 B1 | 7/2004 | Roberson et al. |
| 6,886,138 B2 | 4/2005 | Laffey et al. |
| 6,922,815 B2 | 7/2005 | Rosen |
| 6,938,218 B1 | 8/2005 | Rosen |
| 6,983,424 B1* | 1/2006 | Dutta ............................ 715/800 |
| 7,028,050 B1 | 4/2006 | Rose |
| 7,043,701 B2 | 5/2006 | Gordon |
| 7,093,199 B2 | 8/2006 | Cragun et al. |
| 7,107,549 B2 | 9/2006 | Deaton et al. |
| 7,119,819 B1 | 10/2006 | Robertson et al. |
| 7,134,095 B1 | 11/2006 | Smith et al. |
| 7,137,075 B2 | 11/2006 | Hoshino et al. |
| 7,146,576 B2 | 12/2006 | Chang et al. |
| 7,148,892 B2 | 12/2006 | Robertson et al. |
| 7,168,051 B2 | 1/2007 | Robinson et al. |
| 7,178,111 B2 | 2/2007 | Glein et al. |
| 7,216,305 B1 | 5/2007 | Jaeger |
| 7,222,309 B2 | 5/2007 | Chupin et al. |
| 7,249,327 B2 | 7/2007 | Nelson et al. |
| 7,263,667 B1 | 8/2007 | Hoellerer et al. |
| 7,266,768 B2 | 9/2007 | Ferlitsch et al. |
| 7,292,243 B1 | 11/2007 | Burke |
| 7,299,418 B2 | 11/2007 | Dieberger |
| 7,299,419 B2 | 11/2007 | Evans |
| 7,441,201 B1 | 10/2008 | Printezis |
| 7,478,326 B2 | 1/2009 | Holecek et al. |
| 7,480,873 B2 | 1/2009 | Kawahara |
| 7,490,314 B2 | 2/2009 | Yuknewicz et al. |
| 7,512,902 B2 | 3/2009 | Robertson et al. |
| 7,523,391 B1 | 4/2009 | Eizenhoefer |
| 7,536,650 B1 | 5/2009 | Robertson et al. |
| 7,543,245 B2 | 6/2009 | Irimajiri |
| 7,546,538 B2 | 6/2009 | Shuping et al. |
| 7,562,312 B2 | 7/2009 | Rochford et al. |
| 7,587,681 B2 | 9/2009 | Kake et al. |
| 7,603,652 B2 | 10/2009 | Makowski et al. |
| 7,665,033 B2 | 2/2010 | Byrne et al. |
| 7,673,241 B2 | 3/2010 | Sun et al. |
| 7,698,658 B2 | 4/2010 | Ohwa et al. |
| 7,730,425 B2 | 6/2010 | de los Reyes et al. |
| 7,792,748 B1 | 9/2010 | Ebersole et al. |
| 7,991,720 B2 | 8/2011 | Mander et al. |
| 7,996,782 B2 | 8/2011 | Hayles et al. |
| 8,001,472 B2 | 8/2011 | Gilley et al. |
| 8,095,882 B2 | 1/2012 | Kashi |
| 8,136,088 B2 | 3/2012 | Makowski et al. |
| 8,185,220 B2 | 5/2012 | Lloyd |
| 8,250,486 B2 | 8/2012 | Lentz |
| 8,381,122 B2 | 2/2013 | Louch et al. |
| 8,473,859 B2 | 6/2013 | Chaudhri et al. |
| 2001/0028369 A1 | 10/2001 | Gallo et al. |
| 2002/0010718 A1 | 1/2002 | Miller |
| 2002/0033848 A1 | 3/2002 | Sciammarella et al. |
| 2002/0080180 A1 | 6/2002 | Mander et al. |
| 2002/0091739 A1 | 7/2002 | Ferlitsch et al. |
| 2002/0113820 A1 | 8/2002 | Robinson et al. |
| 2002/0135538 A1 | 9/2002 | Rosen |
| 2002/0140746 A1 | 10/2002 | Gargi |
| 2002/0167546 A1 | 11/2002 | Kimbell et al. |
| 2003/0007017 A1 | 1/2003 | Laffey et al. |
| 2003/0052927 A1 | 3/2003 | Barksdale et al. |
| 2003/0088452 A1 | 5/2003 | Kelly |
| 2003/0090510 A1 | 5/2003 | Shuping et al. |
| 2003/0128242 A1 | 7/2003 | Gordon |
| 2003/0142143 A1 | 7/2003 | Brown et al. |
| 2003/0146927 A1 | 8/2003 | Crow et al. |
| 2003/0160815 A1 | 8/2003 | Muschetto |
| 2003/0169303 A1 | 9/2003 | Islam et al. |
| 2003/0179234 A1 | 9/2003 | Nelson et al. |
| 2003/0179237 A1 | 9/2003 | Nelson et al. |
| 2003/0179240 A1 | 9/2003 | Gest |
| 2003/0189602 A1 | 10/2003 | Dalton et al. |
| 2003/0222902 A1 | 12/2003 | Chupin et al. |
| 2004/0030741 A1 | 2/2004 | Wolton et al. |
| 2004/0066411 A1 | 4/2004 | Fung et al. |
| 2004/0066414 A1 | 4/2004 | Czerwinski et al. |
| 2004/0090472 A1 | 5/2004 | Risch et al. |
| 2004/0109025 A1 | 6/2004 | Hullot et al. |
| 2004/0109031 A1 | 6/2004 | Deaton et al. |
| 2004/0135820 A1 | 7/2004 | Deaton et al. |
| 2004/0155909 A1 | 8/2004 | Wagner |
| 2004/0179519 A1 | 9/2004 | Basso et al. |
| 2004/0212640 A1* | 10/2004 | Mann et al. ................... 345/792 |
| 2005/0010876 A1 | 1/2005 | Robertson et al. |
| 2005/0022139 A1 | 1/2005 | Gettman et al. |
| 2005/0066292 A1 | 3/2005 | Harrington |
| 2005/0091596 A1 | 4/2005 | Anthony et al. |
| 2005/0183009 A1 | 8/2005 | Hannebauer et al. |
| 2005/0204306 A1 | 9/2005 | Kawahara et al. |
| 2005/0240880 A1 | 10/2005 | Banks et al. |
| 2005/0243373 A1 | 11/2005 | Silverbrook et al. |
| 2005/0283742 A1 | 12/2005 | Gusmorino et al. |
| 2006/0010379 A1 | 1/2006 | Kashi |
| 2006/0015818 A1 | 1/2006 | Chaudhri et al. |
| 2006/0107229 A1 | 5/2006 | Matthews et al. |
| 2006/0136840 A1 | 6/2006 | Keely et al. |
| 2006/0161861 A1 | 7/2006 | Holecek et al. |
| 2006/0161868 A1 | 7/2006 | Van Dok et al. |
| 2006/0174211 A1 | 8/2006 | Hoellerer et al. |
| 2006/0212833 A1 | 9/2006 | Gallagher et al. |
| 2006/0224986 A1 | 10/2006 | Lindsay et al. |
| 2007/0011617 A1 | 1/2007 | Akagawa et al. |
| 2007/0055947 A1 | 3/2007 | Ostojic et al. |
| 2007/0124699 A1 | 5/2007 | Michaels |
| 2007/0164989 A1 | 7/2007 | Rochford et al. |
| 2007/0192727 A1 | 8/2007 | Finley et al. |
| 2007/0214431 A1* | 9/2007 | Amadio et al. ............... 715/788 |
| 2007/0214436 A1 | 9/2007 | Myers |
| 2007/0226652 A1 | 9/2007 | Kikuchi et al. |
| 2007/0261003 A1 | 11/2007 | Reissmueller |
| 2008/0040678 A1 | 2/2008 | Crump |
| 2008/0059893 A1 | 3/2008 | Byrne et al. |
| 2008/0072252 A1 | 3/2008 | Morris et al. |
| 2008/0126956 A1 | 5/2008 | Kodosky et al. |
| 2008/0134086 A1 | 6/2008 | Liao et al. |
| 2008/0220747 A1 | 9/2008 | Ashkenazi et al. |
| 2008/0222295 A1 | 9/2008 | Robinson et al. |
| 2008/0263463 A1 | 10/2008 | Neumann |
| 2008/0270946 A1 | 10/2008 | Risch et al. |
| 2008/0307330 A1 | 12/2008 | Louch et al. |
| 2008/0307335 A1 | 12/2008 | Chaudhri et al. |
| 2008/0307360 A1 | 12/2008 | Chaudhri et al. |
| 2008/0307364 A1 | 12/2008 | Chaudhri et al. |

(56) References Cited

U.S. PATENT DOCUMENTS

| | | | |
|---|---|---|---|
| 2009/0031246 | A1 | 1/2009 | Cowtan et al. |
| 2009/0228827 | A1 | 9/2009 | Robertson et al. |
| 2009/0307623 | A1 | 12/2009 | Agarawala et al. |

OTHER PUBLICATIONS

3DNA Desktop [online], [retrieved Nov. 9, 2006]. Retrieved from the Internet URL: http://www.3dna.net/products/desktop.htm.
Metisse—Screenshots [on-line], [retrieved Nov. 9, 2006]. Retrieved from the Internet URL: http://insitu.lri.fr/~chapuis/metisse/screenshots.
Spatial Research [on-line], [retrieved Nov. 9, 2006]. Retrieved from the Internet URL: http://www.spatialresearch.com/spaces.
The TaskGallery [on-line], [retrieved Nov. 9, 2006]. Retrieved from the Internet URL: http://research.microsoft.com/ui/TaskGaller.
Rotate Widow, Java Technology Powers Vodafone Mobile Games Worldwide. Copyright 1994-2006 Sun Microsystems, Inc. [on-line], [retrieved Nov. 9, 2006], Retrieved from the Internet URL: http://www.sun.com/jsp_utils/ScreenShotPopup.jsp?title=R...ss/&im=md_1.jpg&alt=Generic%20Screen%20Shot%20Alt%20Text.
Switch Desktops, Copyright 1994-2006 Sun Microsystems, Inc. [on-line], [retrieved Nov. 9, 2006], Retrieved from the internet URL: http://www.sun.com/jsp_utils/ScreenShotPopup.jsp?title=Sw.../&im=pan-r_3.jpg&alt-Generic%20Screen%20Shot%20Alt%20Text11/9/2006.
Stanford Panorama, Copyright 1994-2006 Sun Microsystems, Inc. [on-line], [retrieved Nov. 9, 2006], Retrieved from the internet URL: http://www.sun.com/jsp_utils/ScreenShotPopup.jsp?title=St.../&im=pan_2.jpg&alt=Generic%20Screen%20Shot%20Alt%20Text11/9/2006.
Java Solaris Communities Partners My Sun Sun [on-line], [retrieved Nov. 9, 2006], Retrieved from the internet URL: http://www.sun.com/software/looking_glass/details.xml.
3D Desktop Project by Sun MicroSystems: A Revolutionary Evolution of Today's Desktop [online]. [retrieved Nov. 9, 2006], Retrieved from the internet URL: http://www.lg3d.dev.java.net.
Agarawala A. and Balakrishnan R. (2006). "Keepin' It Real: Pushing the Desktop Metaphor with Physics, Piles and the Pen". [on-line], [retrieved May 14, 2008]. Retrieved from the internet URL: http://bumptop.com/BumpTop. Montréal, Québec, Canada.
BumpTop 3D Desktop Prototype—www.bumptop.com. (2008). [on-line], [retrieved May 14, 2008]. Retrieved from the internet URL: http://www.youtube.com/watch?v=M0ODskdEPnQ.
Hideya Kawahara and Paul Byme, Project Looking Glass Cool LG3D Apps and How to Write Them Powerpoint, 2005 JavaOne Conference Session 7992, 32 slides.
Dana Nourie and Hideya Kawahara, Project Looking Glass: Its Architecture and a Sneak Preview of the API, Nov. 2004.
Authorized Officer Marja Brouwers, Notification of Transmittal of the International Search Report and the Written Opinion, PCT/US2008/065324, mailed Oct. 14, 2008, 11 pages.
Authorized Officer Beate Giffo-Schmitt, Notification Concerning Transmittal of International Preliminary Report on Patentability, PCT/US2008/065324, mailed Dec. 23, 2009, 6 pages.
Schultz, Greg, "Windows Aero—Vista's Premium User Interface," Nov. 30, 2006, 5 pages.

\* cited by examiner

//OVERFLOW STACK USER INTERFACE

BACKGROUND

A graphical user interface allows a large number of graphical objects or items to be displayed on a display screen at the same time. Leading personal computer operating systems, such as the Apple Mac OS®, provide user interfaces in which a number of graphical representations of system objects can be displayed according to the needs of the user. Example system objects include system functions, alerts, windows, peripherals, files, and applications, Taskbars, menus, virtual buttons, a mouse, a keyboard, and other user interface elements provide mechanisms for accessing and/or activating the system objects corresponding to the displayed representations.

The graphical objects and access to the corresponding system objects and related functions, however, should be presented in a manner that facilitates an intuitive user experience. The use of metaphors that represent concrete, familiar ideas facilitate such an intuitive user experience. For example, the metaphor of a document or photo can be used to identify an electronic file; the metaphor of fife folders can be used for storing documents, etc.

SUMMARY

Disclosed herein are methods, apparatus and systems including an overflow stack user interface. In an implementation, a computer-implemented method associates graphical representations of system objects into a group and displays the group in a group display area. The group display area can be adjusted, and a determination can he made whether the associated graphical representations of system objects can be displayed in the adjusted group display area based upon one or more display criterion. A representation of two or more of the associated graphical representations of system objects can be provided by a stack item if the associated graphical representations of system objects can not be displayed in the adjusted group display area based on the one or more display criterion.

In another implementation, a computer-readable medium stores instructions that upon execution cause a processing device to associate graphical representations of system objects in a group and display the graphical representations of system objects in a group display area. Adjustment of the group display area can be made based upon user input, and a determination can be made whether the associated graphical representations of system objects can be displayed in the adjusted group display area based upon one or more display criterion. A representation of two or more of the associated graphical representations of system objects can be provided in a stack item based on the display criterion.

DETAILED DESCRIPTION

Figure 1:
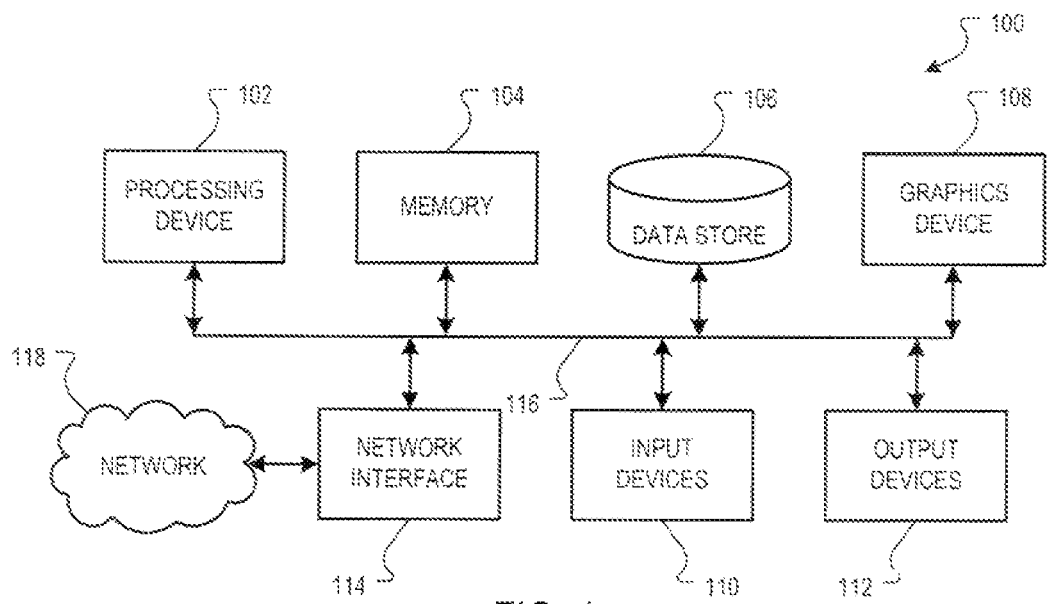
FIG. 1 is a block diagram of an example system that can be utilized to implement the systems and methods described herein.

FIG. 1 is a block diagram of an example system 100. The system 100 can, for example, be implemented in a computer device, such as any one of the personal computer devices available from Apple Computer, Inc., or other electronic devices. Other example implementations can also include video processing devices, multimedia processing devices, portable computing devices, portable communication devices, set fop boxes, personal digital assistants, and other electronic devices.

The example system 100 includes a processing device 102, a first data store 104, a second data store 106, a graphics device 108, input devices 110, output devices 112, and a network device 114. A bus system 116, such as a data bus and a motherboard, can be used to establish and control data communication between the components 102, 104, 106, 108, 110, 112 and 114. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

The graphics device 108 can, for example, include a video card, a graphics accelerator card, or a display adapter, and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 118. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can include one or more local area networks (LANs) or a wide area network (WAN), such as the internet.

In an implementation, the system 100 includes instructions defining an operating system stored in the first data store 104 and/or the second data store 108. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
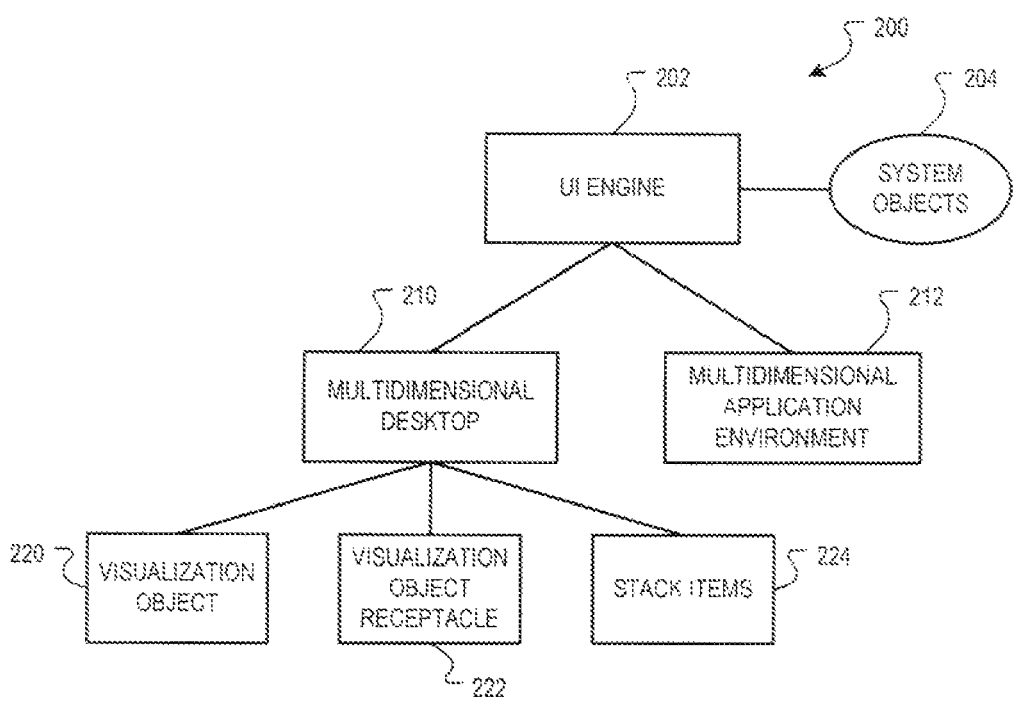
FIG. 2A is a block diagram of an example user interface architecture.
FIG. 2B is a block diagram depicting an example stack item.

FIG. 2A is a block diagram of an example user interface architecture 200. The user interface architecture 200 includes a user interface (UI) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a multidimensional desktop 210 and a multidimensional application environment 212. In an implementation, the multidimensional desktop 210 and the multidimensional application environment 212 include x-, y- and z-axis aspects, e.g., a height, width and depth aspect. The x-, y- and z-axis aspects may define a three-dimensional environment, e.g., a "3D" or "2.5D" environment that includes a z-axis, e.g., depth, aspect.

In an implementation, the multidimensional desktop 210 can include visualization objects 220, a visualization object receptacle 222, and stack items 224. An example implementation of a visualization object receptacle 300 is the "Dock" user interface in the MAC OS® X Leopard operating system. Other implementations can also be used. In some implementations, the visualization objects 220, the visualization object receptacle 222 and the stack items 224 can be presented in a pseudo-three dimensional (i.e., "2.5D") or a three-dimensional environment as graphical objects having a depth aspect.

A visualization object 220 can, for example, be a visual representation of a system object, in some implementations, the visualization objects 220 are icons. Other visualization objects can also be used, e.g., alter notification windows, menu command bars, windows, or other visual representations of system objects.

In an implementation, the multidimensional application environment 212 can include an application environment distributed along a depth aspect. For example, a content frame, e.g., an application window, can be presented on a first surface, and control elements, e.g., toolbar commands, can be presented on a second surface.

Figure 2B:
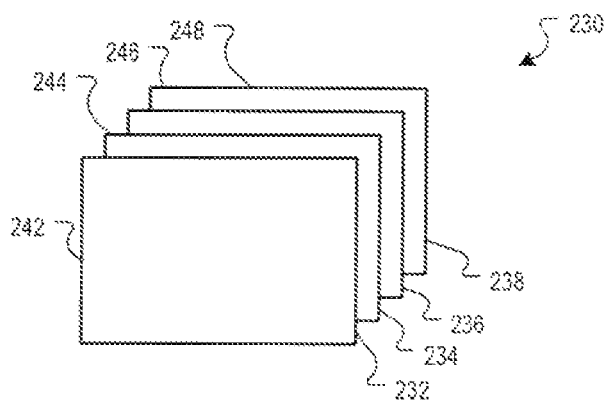

FIG. 2B is a block diagram depicting an example stack item 230. Stack items are described in detail in U.S. application Ser. No. 11/760,595, entitled "MULTIDIMENSIONAL DESKTOP," filed on Jun. 8, 2007, which is hereby incorporated by reference, in one implementation, the stack item 230 is a system object that includes a plurality of stack elements, e.g., stack elements 232, 234, 236 and 238, such as icons corresponding to system objects. The stack item 230 is associated with the stack elements 232, 234, 236 and 238 so that selection of the stack item can provide access to any of the stack elements 232, 234, 236 and 238. In one implementation, a stack element can, for example, be realized by a corresponding icon of a system object. In another implementation, a stack element can, for example, be realized by a corresponding thumbnail icon of a system object, in another implementation, a stack element can, for example, be realized by a different corresponding icon of a system object. In another implementation, a stack element can, for example, be realized by a common stack element icon. Other stack element realizations can also be used.

In one implementation, the stack elements 232, 234, 236 and 238 are aggregated in an overlapping arrangement as shown in FIG. 2B. Other stack arrangements can also be used.

In one implementation, each stack element 232, 234, 236 and 238 displays a corresponding unique indicium 232, 234, 236 and 238, e.g., a thumbnail preview of an image associated with the stack element or the first page of a document associated with the stack element. Other unique indicium or unique indicia can also be used. For example, stack items corresponding to images can be of the same aspect of the image, e.g., a 4×5 aspect, and 9×12 aspect, etc. Likewise, stack items corresponding to documents can be of the same aspect of a paper selection, e.g., an 8.5×11 aspect, an A4 aspect, etc. Other unique indicium or indicia can also be used, e.g., a document size and/or a document date can be displayed in each stack element, etc.

The stack item 230 can include icons related to different types of system objects. For example, a stack item can include stack elements related to peripheral devices, e.g., hard drives, universal serial bus devices, etc.; or can include stack elements related to application windows; or can include stack elements related to system functions, e.g., menus, a shutdown function, a sleep function, a backup function, etc.; or can includes stack elements related to recent system alerts; or other system objects.

Figure 3:
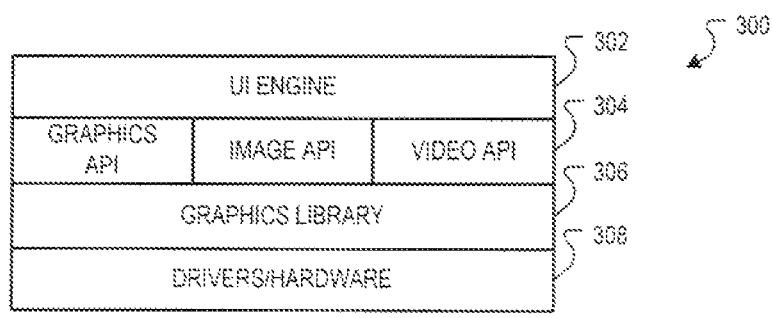
FIG. 3 is a block diagram of an example system layer structure that can be utilized to implement the systems and methods described herein.

FIG. 3 is block diagram of example system layers 600 that can be utilized to implement the systems and methods described herein. Other system layer implementations, however, can also be used.

In an implementation, a user interface engine, such as the UI engine 202, or another UI engine capable of generating a three-dimensional user interface environment, operates at an application level 602 and implements graphical functions and features available through an application program interface (API) layer 804. Example graphical functions and features include graphical processing, supported by a graphics API, image processing, support by an imaging API, and video processing, supported by a video API.

The API layer 604, in turn, interfaces with a graphics library layer 606. The graphics library layer 604 can, for example, be implemented as a software interface to graphics hardware, such as an implementation of the OpenGL specification. A driver/hardware layer 808 includes drivers and associated graphics hardware, such as a graphics card and associated drivers.

Figure 4:
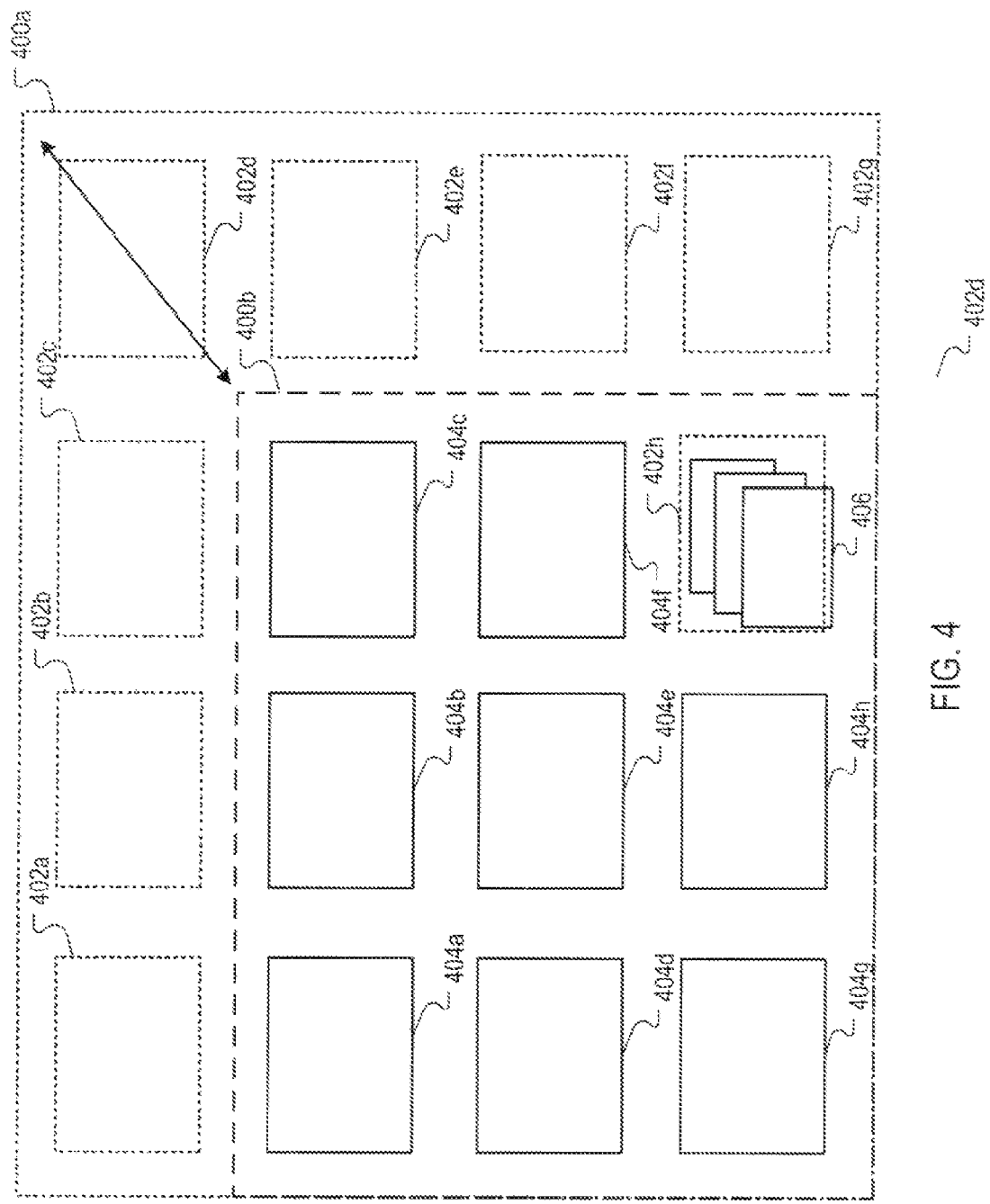
FIG. 4 is a block diagram of a display environment illustrating an example overflow stack.

FIG. 4 is a block diagram of an example display environment illustrating an example overflow stack. One or more stack items (e.g., overflow stack 406) can enable the user to adjust a display environment from a size 400a to a size 400b while retaining a views associated with a group of system objects 402a-h, 404a-h. In some implementations, graphical representations of system objects can be scaled during an adjustment to fit within the display environment. In further implementations, an overflow stack 406 can be generated based upon display criteria associated with the group or with the graphical representation of system objects.

In some implementations, a display environment 400a can be reduced to a scaled display environment 400b based upon user input. In such implementations, display criteria can be used to determine whether the graphical representations of the system objects can be displayed in the scaled display environment 400b. In some implementations, an aspect ratio associated with the graphical representations of system objects can be reduced in size to fit the graphical representations within the display environment. In some implementations, a minimum size and/or maximum size can be associated with the graphical representations. In other implementations, a spacing between the graphical representations of system objects can be reduced. In further implementations, a minimum or maximum spacing between graphical representations of system objects can be specified. The minimum size, maximum size, minimum spacing and maximum spacing can be included as display criteria.

In those implementations where the display criteria prevents the graphical representation of each of the system objects from being displayed in the display environment 400b, an overflow stack 406 can be generated. The overflow stack 406 can include those graphical representations of system objects, which are not displayed in the scaled display environment 400b based on the display criteria, e.g., 402a-h. Those graphical representations of system objects 404a-h which can be displayed in the adjusted display environment 400b can retain their position within the scaled display environment 400b.

In other implementations, a display environment 400b can be enlarged to a scaled display environment 400a based upon user input. In such implementations, display criteria can be used to determine whether the graphical representations of the system objects included in an overflow stack 406 can be displayed in the scaled display environment 400a. In some implementations, the graphical representations of system objects can be enlarged in size to fit the graphical representations within the display environment. In some implementations, a user or a programmer can set a minimum size or maximum size associated with the graphical representations. In some implementations, such scaling and spacing adjustments can be performed until the display environment is operable to display of the graphical representation of each of the system objects 402a-h included in the overflow stack 406 based upon the display criteria.

In extensions to the above implementations, the display environment can be adjusted based upon system constraints. For example, a new application launched by the system or a user might reduce any display environment available for the display environment from display environment 400a to display environment 400b. Thus, the system might adjust the display environment 400a to scaled display environment 400b. Alternatively, an existing application can be reduced or terminated, enabling the system to use additional display environment. Thus, the system might adjust the display environment 400b to scaled display environment 400a.

In further examples, a display environment might be terminated. For example a display device (e.g., a monitor) might be disconnected from the system. In some implementations, when a display environment is terminated, the graphical representations of those system objects being viewed in the terminated display environment can be transferred to a second display environment (e.g., a second display device). The graphical representations of those system objects transferred to the second display environment can be represented, in some implementations, using a stack item (e.g., an overflow stack). Thus, the graphical representations of those system objects and the association between those system objects in the terminated display environment are not lost, but instead can be transferred to a remaining display environment as an overflow stack.

Figure 5B:
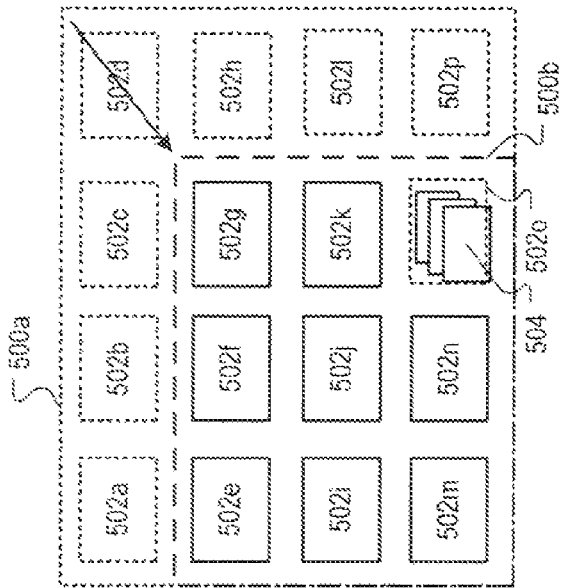
FIGS. 5A-5C are block diagrams depicting an example display environment adjustment generating an overflow stack.
Figure 5C:
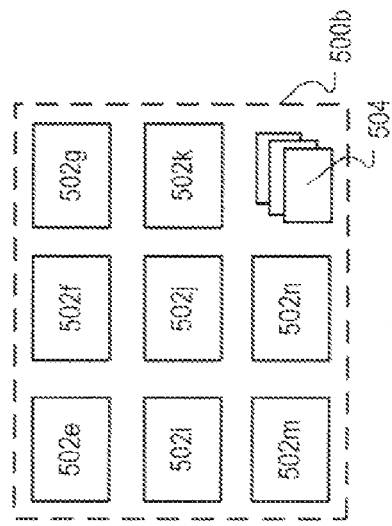
Figure 5A:
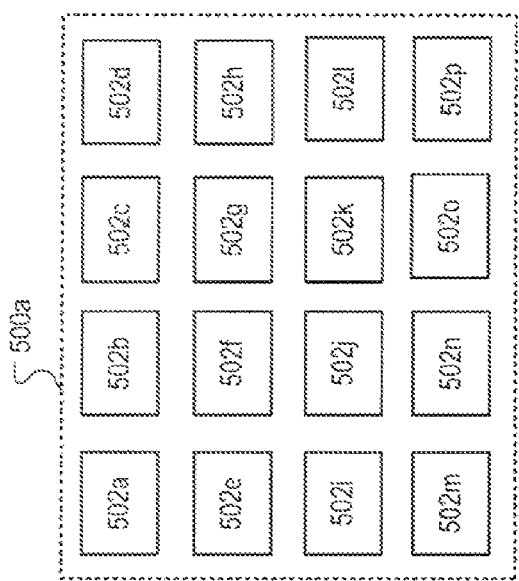

FIGS. 5A-5C are block diagrams depicting an example display environment adjustment generating an overflow stack. The display environment 500a can include a number of graphical representations 502a-p of system objects grouped together based upon an association (e.g., user input common file type, creation date, etc.). In some implementations, the display environment 500a can result from a user selecting and associating a number of graphical representations 502a-p of system objects. In other implementations, the display environment 500a can result from the selection of a group stack representation. In some implementations, the display environment 500a can represent each of the system objects in a matrix including the graphical representations of the system objects, in some implementations, the system objects might not be grouped, but rather those system objects included in a window, such as for example, when the user is viewing contents associated with a directory.

FIG. 5B depicts an example display environment adjustment being initiated. The display environment adjustment is operable to adjusting the original display environment 500a to a scaled display environment 500b. This example shows a reduction of the display environment size. However, other examples can include an enlargement of the display environment size. Display criteria associated with the group can be operable to determine whether the graphical representation of each of the system objects can be include in the scaled display environment 500b. In this example, graphical representations 502a, 502b, 502c, 502d, 502h, 502i, 502o and 502p are excluded from the scaled display environment 500b based upon the display criteria. Graphical representations 502a, 502b, 502c, 502d, 502h, 502i, 502o and 502p can be collapsed into an overflow slack 504. The overflow stack 504 in various implementations, can include a stacked representation of each of the graphical representations 502a, 502b, 502c, 502d, 502h, 502i, 502o and 502p excluded from the scaled display environment 502b by the display criteria.

FIG. 5C depicts the scaled display environment. The sealed display environment 500b can include those graphical representations 502e, 502f, 502g, 502i, 502j, 502k, 502m, 502n which can be included within the scaled display environment 500b based upon the display criteria. The scaled display environment 500b can also include a stack representation 504 of those graphical representations of display objects which are not included in the display environment based upon the display criteria.

In some implementations, a system can include a prioritization associated with the system objects represented by a grouping. FIGS. 6A and 6B show an example display environment adjustment based upon a prioritization of associated system objects. The graphical representations 610a-p of system objects include a prioritization. In various implementations, the system objects can be prioritized based upon any metric associated with the objects. For example, the prioritization can be based upon alphabetical order of the object names, creation date, last modified date, file type, etc. In other implementations, the prioritization can be based upon user input. In the example shown, system objects represented by graphical representations 610a-h are higher in priority than those system objects represented by graphical representations 610i-p. Thus, the system objects represented by graphical representations 610i-p are used to generate a stack item (e.g., an overflow stack 630a).

As shown in FIG. 6B, the system objects that remain in the group display area 600b are represented by graphical representations 610a-h and are accompanied by the overflow stack 630a. In some implementations, the graphical representations 610a-h can be rearranged based upon the new group display area 600b.

Figure 6C:
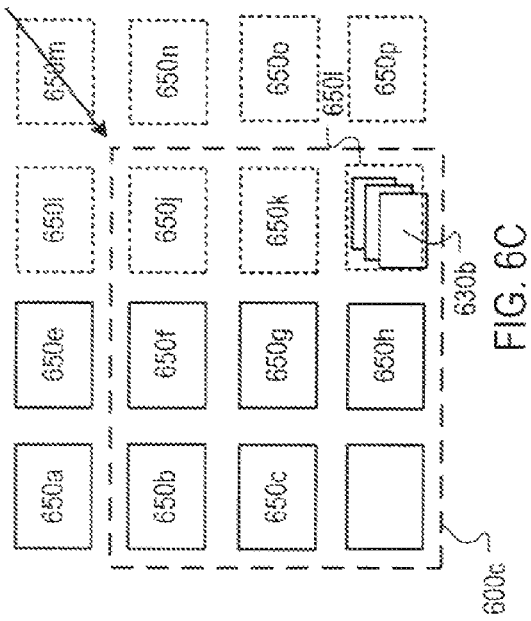
FIGS. 6C and 6D are block diagrams depicting an example display environment adjustment including an alternative prioritization.
Figure 6D:
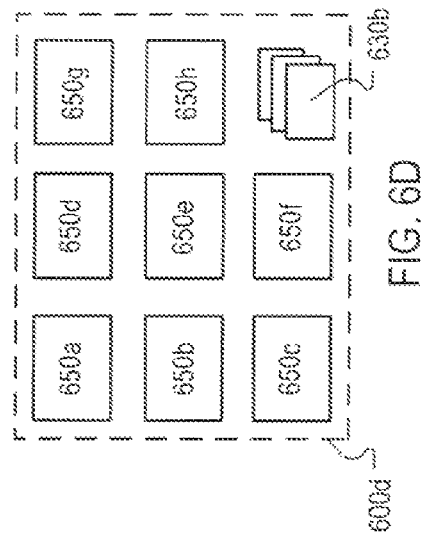
Figure 6A:
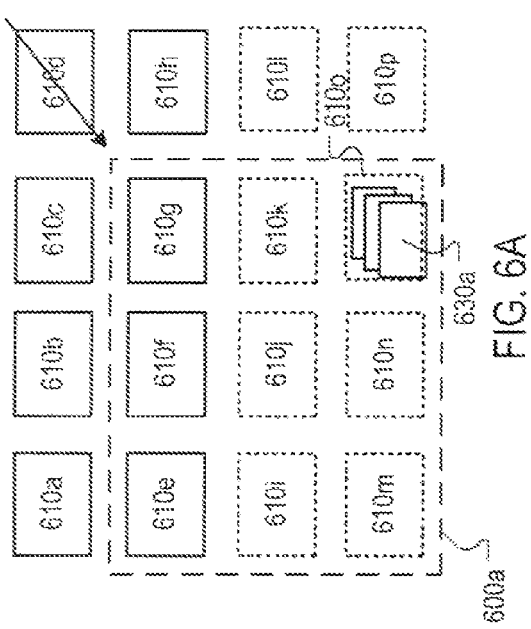
FIGS. 6A and 6B are block diagrams depicting an example display environment adjustment including a prioritization.
Figure 6B:
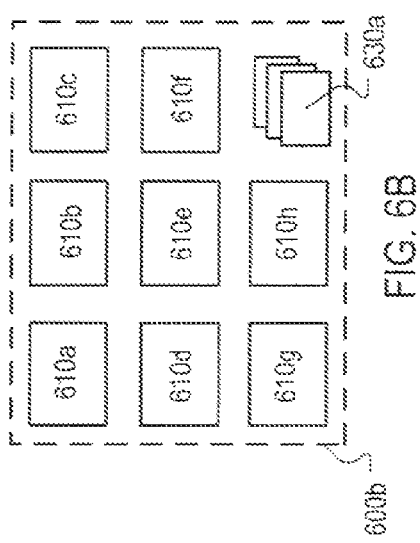

In another example prioritization, FIGS. 6C and 6D show another example display environment adjustment based upon a prioritization of associated system objects. The graphical representations 650a-p of system objects include a prioritization. In this example, system objects represented by graphical representations 850a-h are higher in priority than those system objects represented by graphical representations 650i-p based upon the prioritization of the system objects.

Thus, the system objects represented by graphical representations 650*i-p* are used to generate a stack item (e.g., an overflow stack 630*b*).

As shown in FIG. 6D, the system objects that remain in the group display area 600*d* are represented by graphical representations 610*a-h* and are accompanied by the overflow stack 630*b*. In some implementations, the graphical representations 650*a-h* can be rearranged based upon the new group display area 600*d*.

In some implementations, the overflow stack 630*a*, 630*b* can be displayed in a variety of ways. For example, in some implementations, the overflow stack can include stack representations depicting each of the system objects included in the overflow stack 630*a*, 630*b*. In further implementations, the overflow stack can expand or rotate to show graphical representations associated with each of the system objects included in the overflow stack 630*a*, 630*b*. In other implementations, the overflow stack 630*a*, 630*b* might not include stack representations associated with each of the system objects, but instead merely serve as an indication that the group includes more system objects not displayed by within the group display area 600*b*, 600*d*.

Figure 7:
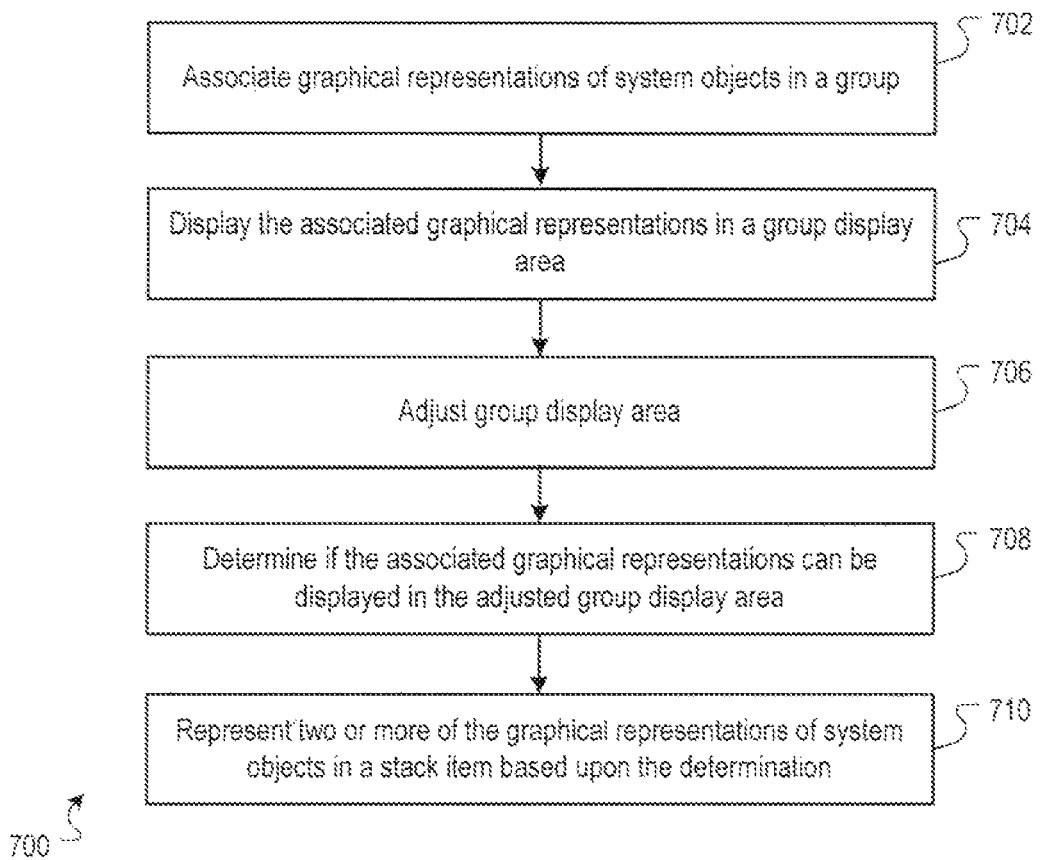
FIG. 7 is a flowchart illustrating an example method of providing an overflow stack.

FIG. 7 is a flowchart illustrating an example method 700 for displaying graphical objects on a display space including providing an overflow stack. At stage 702, graphical representations of system objects are associated with a group. The graphical representations of system objects can be associated with a group, for example, by a user interface engine (e.g., UI engine 202, 302 of FIGS. 2-3). In various implementations, the graphical representations can be associated based upon user input, system rules, etc.

At stage 704, associated graphical representations can be displayed in a group display area. The graphical representations can be displayed in a group display area, for example, by a user interface engine (e.g., UI engine 202, 302 of FIGS. 2-3) in conjunction with an API layer (e.g., API layer 304 of FIG. 3), a graphics library (e.g., graphics library 306 of FIG. 3) and a graphics card and display device (e.g., drivers/hardware 308 of FIG. 3). In some implementations, the group display area can include a matrix display of the graphical representations of those system objects included in the group and/or stack items (e.g., an overflow stack) based upon display criteria.

At stage 706, the group display area can be adjusted. The group display area can be adjusted, for example, by a user interface (e.g., UI engine 202, 302 of FIGS. 2-3). In some implementations, the group display area is adjusted based upon user input. In additional implementations, the group display area can be adjusted based upon system constraints (e.g., a new application launch).

At stage 708, a determination is made whether the associated graphical representations can be displayed in the adjusted group display area. The determination can be made, for example, by a user interface engine (e.g., UI engine 202, 302 of FIGS. 2-3). In some implementations, the determination can be made based upon display criteria associated with the system, with the group, or with the system objects themselves. Display criteria, in various implementations, can include a minimum or maximum graphical representation associated with system objects, minimum or maximum spacing distance between graphical representations of system objects, etc. Other display criteria are possible.

At stage 710, two or more of the graphical representations of system objects can be represented in a stack item based upon the determination. Two or more of the graphical representations of system objects can represented in a stack item, for example, by a user interface engine (e.g., UI engine 202, 302 of FIGS. 2-3), in some. implementations, the stack item can include a stack representation associated with each of the system objects represented by the stack item. In some implementations, the stack item can rotate to enable a user to see the system objects represented by the stack item. In further implementations, the stack item can be expanded to view the system objects represented by the stack item.

Figure 8:
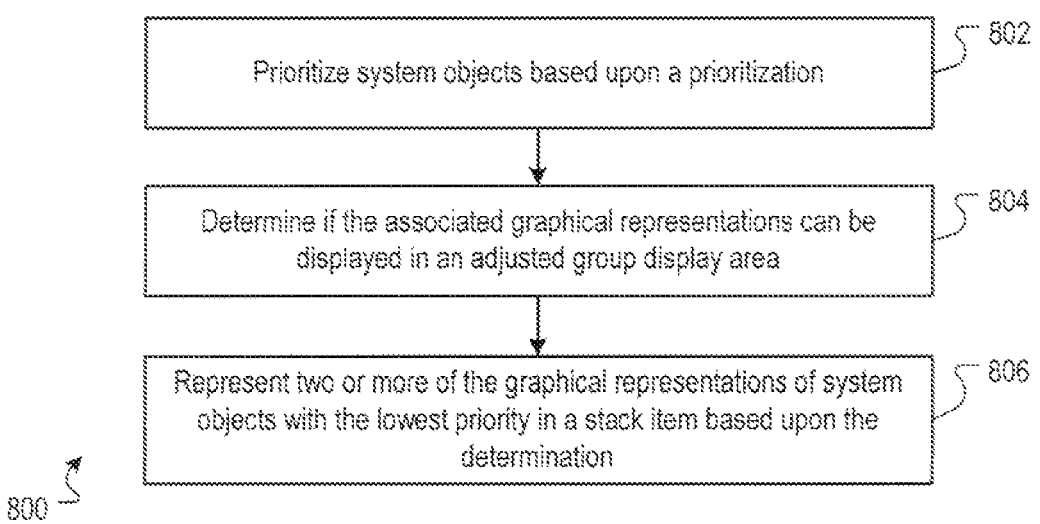
FIG. 8 is a flowchart illustrating an example method of providing a prioritization for an overflow stack.

FIG. 8 is a flowchart illustrating an example method of providing a prioritization for an overflow stack. At stage 802, system objects can be prioritized based upon a prioritization. The system objects can be prioritized, for example, by a user interface engine (e.g., UI engine 202, 302 of FIGS. 2, 3). In some implementations, the prioritization can be provided, for example, by a user. The prioritization can be based upon measurable object characteristics (e.g., size, object name, creation date, modified date, etc.). In other implementations, the user can provide user input prioritizing the system objects based upon the user's own interpretation of the priority of the system objects.

At stage 804, a determination can be made as to whether the associated graphical representations can be displayed in an adjusted group display area. The determination can be made, for example, by a user interface engine (e.g., user interface engine 202, 302 of FIGS. 2-3). In some implementations, the determination can be made based upon display criteria associated with the system, group, or the system objects.

At stage 806, two or more of the graphical representations of system objects with the lowest priority can be represented in a stack item based upon the determination. The representation of system objects in a stack item can be performed, for example, by a user interface engine (e.g., UI engine 202, 302 of FIGS. 2-3). In some implementations, the system objects with lowest priority among a group can be represented by a stack representation. In further implementations, additional system objects can be added to the stack, based upon additional adjustment of a group display area. In these implementations, graphical representations associated with the lowest priority system objects are added to the stack item first, and graphical representations of the next lowest priority can be added to the stack item second, etc.

In various implementations, an overflow stack can be removed from the group display area based upon the group display area being enlarged and based upon the display criteria. When the group display area is enlarged enough to display each of the graphical representations of system objects included in the group in accordance with the display criteria, the overflow stack can be removed and the graphical representation of ail system objects within the group can be displayed.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
providing for display, in a group display area, a first graphical representation of a first object at an original position, the group display area having a size adjustable by a user;
providing for display one or more second graphical representations each representing a separate second object in the group display area;
resizing the group display area, including reducing the size of the group display area upon receiving a user input;
determining that at least one second graphical representation is located in a portion of the group display area that is visible before the size of the group display area is reduced and invisible after the size of the group display area is reduced, and that the first graphical representation is located in a portion of the group display area that is visible both before and after the size of the group display area is reduced;
generating a stack item including a first stack element and one or more second stack elements, the first stack element representing the first object, each second stack element representing a second object;
excluding the first graphical representation and the one or more second graphical representations from the resized group display area such that both the first graphical representation and the one or more second graphical representations are invisible; and
providing for display, in the resized group display area, the stack item at the original position of the first graphical representation, wherein a greater reduction in the size of the group display area during the resizing causes more second graphical representations to be excluded from display and more second graphical objects be represented in the stack item.

2. The computer implemented method of claim 1, further comprising:
prioritizing the first stack element and a second stack element based upon a prioritization of the first object and a second object.

3. The computer implemented method of claim 2, wherein the prioritization of the first object and the second object is based upon user input.

4. The computer implemented method of claim 2, wherein the prioritization of the first object and the second object is based upon a date associated with each of the first object and the second object.

5. The computer implemented method of claim 2, wherein the prioritization of the first object and the second object is based upon an application associated with each of the first object and the second object.

6. The computer implemented method of claim 1, further comprising:
adjusting an aspect ratio associated with each of the first graphical representation and each second graphical representation based upon adjusting the group display area.

7. The computer implemented method of claim 6, comprising determining that the first graphical representation is to be excluded based on one or more display criteria, wherein the one or more display criteria comprise a minimum aspect ratio associated with the first graphical representation and each second graphical representation.

8. The computer implemented method of claim 7, wherein the one or more display criteria comprise a prioritization associated with the first object and each second object.

9. The computer implemented method of claim 1, wherein the first stack element and the one or more second stack elements are aggregated in an overlapping arrangement.

10. The computer implemented method of claim 1, further comprising:
determining that a display environment associated with the group display area has been terminated; and
displaying graphical representations of objects in the group in a new stack item in a second display environment.

11. The computer implemented method of claim 1, wherein each second graphical representation does not fit within the resized group display area.

12. The computer implemented method of claim 1, further comprising:
resizing the resized group display area into a second resized group display area;
further determining, based upon one or more display criteria, that the first graphical representation and the first graphical representation are to be displayed in the second resized group display area;
in response to the further determining, removing the stack item; and
displaying the first representation and second representation in the second resized group display area.

13. The computer implemented method of claim 1, where resizing the group display area includes scaling the group display area.

14. A non-transitory computer-readable medium storing instructions that are executable by a processing device, and upon such execution cause the processing device to perform operations comprising:
providing for display, in a group display area, a first graphical representation of a first object at an original position, the group display area having a size adjustable by a user;
providing for display one or more second graphical representations each representing a separate second object in the group display area;
resizing the group display area based upon a first user input, including reducing the size of the group display area upon receiving a user input;
determining that at least one second graphical representation is located in a portion of the group display area that is visible before the size of the group display area is reduced and invisible after the size of the group display area is reduced, and that the first graphical representation is located in a portion of the group display area that is visible both before and after the size of the group display area is reduced;
generating a stack item including a first stack element and one or more second stack elements, the first stack element representing the first object, each second stack element representing the second object;
excluding the first graphical representation and the one or more second graphical representations from the resized group display area such that both the first graphical representation and the one or more second graphical representations are invisible; and
providing for display, in the resized group display area, the stack item in the original position of the first graphical representation, wherein a greater reduction in the size of the group display area during the resizing causes more second graphical representations to be excluded from display and more second graphical objects be represented in the stack item.

15. The non-transitory computer-readable medium of claim 14, the operations comprising:

prioritizing the first stack element and a second stack element based upon a prioritization of the first object and a second object.

16. The non-transitory computer-readable medium of claim 14, the operations comprising:
adjusting an aspect ratio associated with each of the first graphical representation and each second graphical representation based upon adjusting the group display area.

17. The non-transitory computer-readable medium of claim 16, comprising determining that the first graphical representation is to be excluded based on one or more display criteria, wherein the one or more display criteria comprise a minimum aspect ratio associated with the first graphical representation and each second graphical representation.

18. The non-transitory computer-readable medium of claim 17, wherein the one or more display criteria comprise a prioritization associated with the first object and each second object.

19. The non-transitory computer-readable medium of claim 14, the operations comprising:
associating the first graphical representation and each second graphical representation in response to a second user input.

20. The non-transitory computer-readable medium of claim 14, the operations comprising:
resizing the resized group display area into a second resized group display area;
further determining, based upon one or more display criteria, that the first graphical representation and the first graphical representation are to be displayed in the second resized group display area;
in response to the further determining, removing the stack item; and
displaying the first representation and second representation in the second resized group display area.

21. A system, comprising:
one or more computers configured to perform operations comprising:
providing for display, in a group display area, a first graphical representation of a first system object in an original position, the group display area having a size adjustable by a user;
providing for display one or more second graphical representations each representing a separate second object in the group display area;
resizing the group display area, including reducing the size of the group display area upon receiving a user input;
determining that at least one second graphical representation is located in a portion of the group display area that is visible before the size of the group display area is reduced and invisible after the size of the group display area is reduced, and that the first graphical representation is located in a portion of the group display area that is visible both before and after the size of the group display area is reduced;
generating a stack item including a first stack element and one or more second stack elements, the first stack element representing the first object, each second stack element representing a second object;
excluding the first graphical representation and the second graphical representation from the resized group display area such that both the first graphical representation and the one or more second graphical representations are invisible; and
providing for display, in the resized group display area, the stack item in the original position of the first graphical representation, wherein a greater reduction in the size of the group display area during the resizing causes more second graphical representations to be excluded from display and more second graphical objects be represented in the stack item.

22. The system of claim 21, the operations further comprising:
prioritizing the first stack element and a second stack element based upon a prioritization of the first object and a second object.

23. The system of claim 21, the operations further comprising:
adjusting an aspect ratio associated with each of the first graphical representation and the second graphical representation based upon adjusting the group display area.

24. The system of claim 21, the operations further comprising:
adjusting a spacing between each of the first graphical representation and the second graphical representation based upon adjusting the group display area.

25. The system of claim 21, the operations further comprising:
receiving user input requesting association of the first graphical representation and the second graphical representation into a group; and
associating the first graphical representation and the second graphical representation into the group based upon the user input.

* * * * *

UNITED STATES PATENT AND TRADEMARK OFFICE
CERTIFICATE OF CORRECTION

| | | |
|---|---|---|
| PATENT NO. | : 8,892,997 B2 | Page 1 of 1 |
| APPLICATION NO. | : 11/760610 | |
| DATED | : November 18, 2014 | |
| INVENTOR(S) | : John O. Louch et al. | |

It is certified that error appears in the above-identified patent and that said Letters Patent is hereby corrected as shown below:

ON THE TITLE PAGE ITEM 56

Page 3, Column 1, Line 9 (Other Publications), delete "TaskGaller." and insert -- TaskGallery. --, therefor.

Page 3, Column 2, Line 4 (Other Publications), delete "Sun Sun" and insert -- Sun --, therefor.

IN THE CLAIMS

Column 10, Line 19-20 (Claim 12), delete "first graphical" and insert -- second graphical --, therefor.

Column 11, Line 29-30 (Claim 20), delete "first graphical" and insert -- second graphical --, therefor.

Signed and Sealed this
Sixth Day of October, 2015

Michelle K. Lee
*Director of the United States Patent and Trademark Office*